United States Patent

[11] 3,629,687

| [72] | Inventor | Petter Hessen<br>Ludvika, Sweden |
| --- | --- | --- |
| [21] | Appl. No. | 99,394 |
| [22] | Filed | Dec. 18, 1970 |
| [45] | Patented | Dec. 21, 1971 |
| [73] | Assignee | Allmanna Svenska Elektriska Aktiebolaget<br>Vasteras, Sweden |
| [32] | Priority | Jan. 5, 1970 |
| [33] | | Sweden |
| [31] | | 52/70 |

[54] ARRANGEMENT IN CONVERTER STATIONS FOR ULTRAHIGH VOLTAGES
10 Claims, 4 Drawing Figs.

[52] U.S. Cl. .................................................. 321/27 R, 32/8 R
[51] Int. Cl. .................................................. H02m 7/00
[50] Field of Search ........................................ 321/8 R, 8 C, 27 R; 307/82; 336/90

[56] References Cited
UNITED STATES PATENTS

| 1,899,981 | 3/1933 | Oesterreicher | 336/90 |
| 3,448,286 | 6/1969 | Stackegard | 307/82 |
| 3,564,386 | 2/1971 | Leonard | 321/8 C |

FOREIGN PATENTS

| 150,421 | 1/1932 | Switzerland | 336/90 |

*Primary Examiner*—William H. Beha, Jr.
*Attorney*—Jennings Bailey, Jr.

ABSTRACT: In converter stations in DC networks for ultrahigh voltages there is at least one chain of converter bridges. The converter bridges in each chain are series connected on the DC side and connected over transformers to an alternating current network on the AC side. When there are two or more chains all chains are connected in parallel between earth and the transmission line in the DC network. At least some of the apparatus connected to high potential, such as transformers, reactors and the like, have their tanks connected to the DC side of the converter chain at a point where the potential in relation to earth is at least half the voltage in the DC network.

3,629,687

INVENTOR.
PETTER HESSEN

INVENTOR.
PETTER HESSEN
BY
Jennings Bailey, Jr

ARRANGEMENT IN CONVERTER STATIONS FOR ULTRAHIGH VOLTAGES

BACKGROUND OF THE INVENTION

1. Field of the Invention

The invention relates to converter stations for ultrahigh voltages.

2. The Prior Art

In converter transformers the rectifier windings, that is those windings which are connected to the converter bridges, must in principle be fully insulated. For equipment having, for example, 750 kv. direct voltage, this means full insulation for the insulation categories necessary in the transformers of rectifier bridges at the highest level. Windings with such high insulation levels in power transformers are normally made with graded insulation, the high voltage output being positioned half way up the leg. The insulation of the yoke is of a considerably lower level. Furthermore, a high voltage, for example 500 kv., insulation category 1,550 kv. is often added to the network winding.

The transformers for the higher converter bridges in the case just mentioned with 750 kv. direct voltage require considerably higher insulation levels for one-step transforming.

SUMMARY OF THE INVENTION

The present invention relates to an arrangement in converter stations for ultra high voltages, in which the transformers and converters, together with equipment pertaining to them, are positioned so that apparatus which is now available may also be used in networks for much higher voltages than would otherwise be possible.

According to the invention, a converter station for connecting a DC network for ultrahigh voltage to an AC network includes parallel chains each formed of a plurality of converter bridges connected in series on the DC sides. Transformers and other electric apparatus connecting the converter bridges to the AC circuit are enclosed in tanks, which are connected to the DC side of the chain at a point where the potential in relation to earth is at least half the voltage in the DC network.

BRIEF DESCRIPTION OF THE DRAWINGS

In the accompanying drawings

DESCRIPTION OF THE PREFERRED EMBODIMENTS

In order to explain the invention a DC network has been selected with a voltage of 750 kv. to earth. The station equipment is shown by two parallel chains A and B, each comprising four series-connected converter bridges I, II, III, IV, which are connected by transformers to the AC network C. It should, however, be pointed out from the start that the invention is not limited in any way to the voltage stated, the number of chains or the number of converter bridges in the chains. The latter number may be smaller or greater than four. The converter bridges are built up in known manner from rectifier units and the three parallel units within each bridge are connected together at both ends of the bridge. All this is well known.

Figure 1:
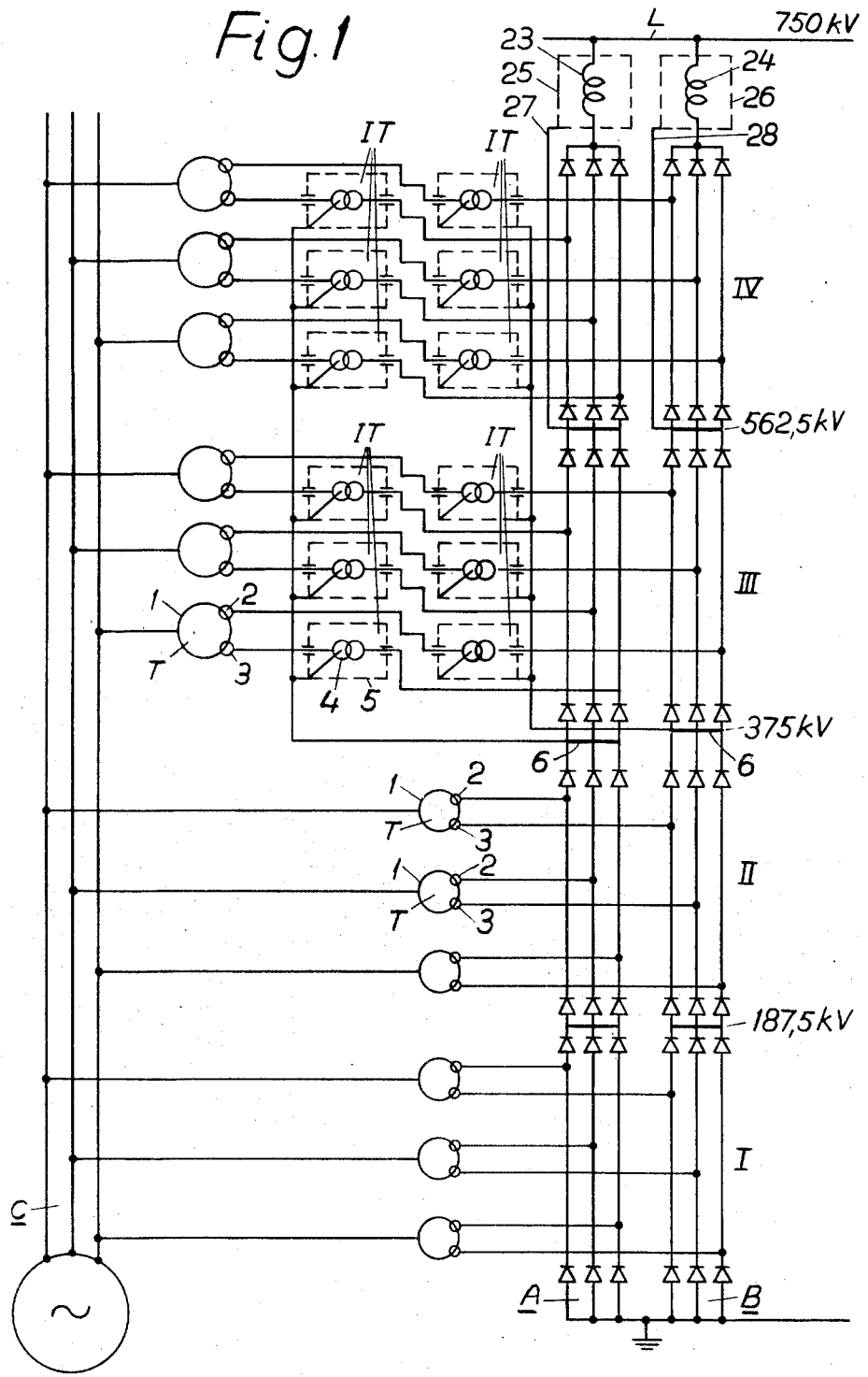
FIGS. 1 and 2 show two alternative connection diagrams for a converter station for ultra high voltages.
Figure 2:
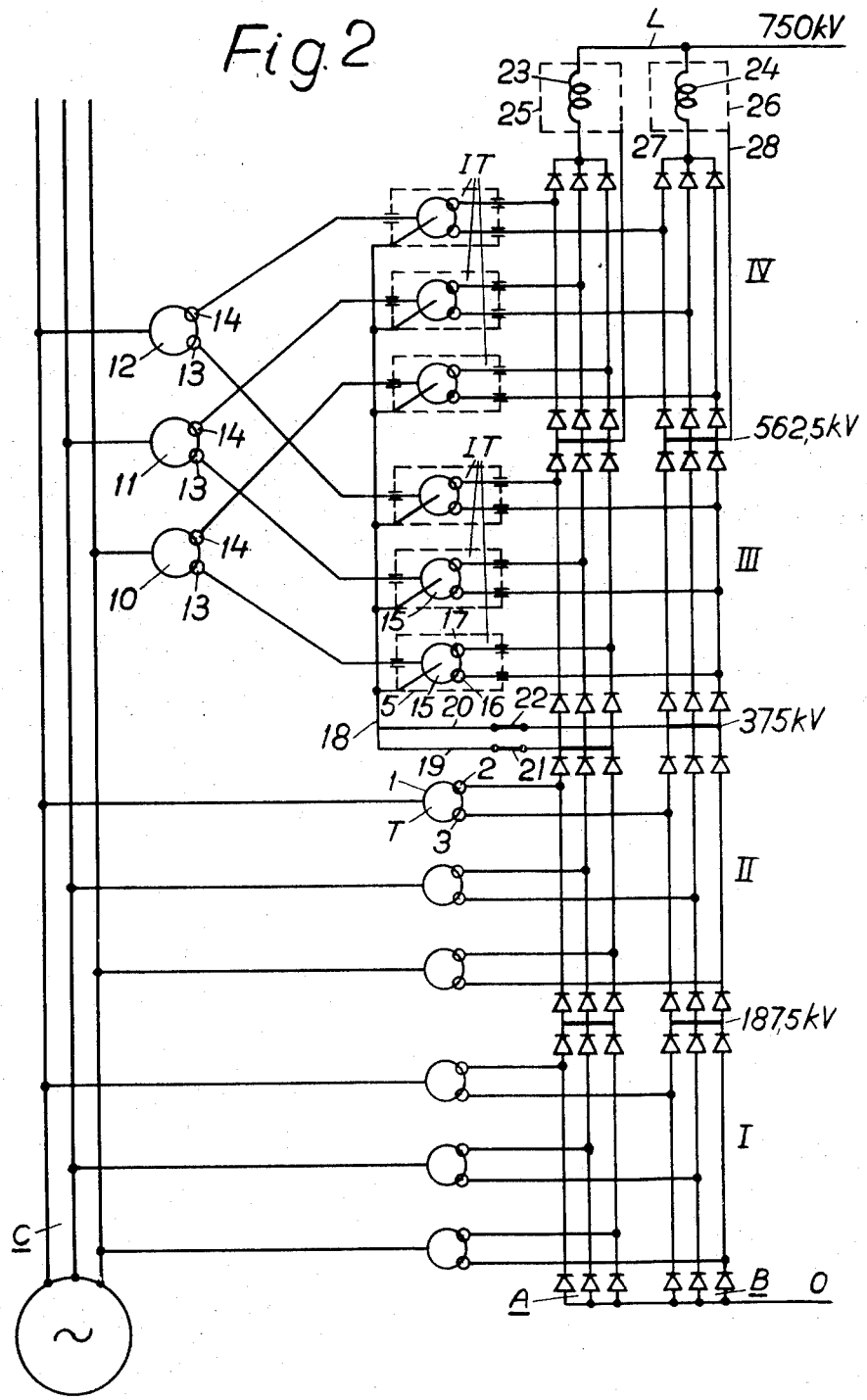

The two lower bridges I and II in FIGS. 1 and 2 are connected in known manner to the AC network C by means of transformers T, shown here as three-winding transformers having a primary winding 1 connected to the AC network C and two secondary windings 2 and 3. The winding 2 is connected to chain A whereas the winding 3 is connected to chain B. Of course it is also possible to have two two-winding transformers instead of one three-winding transformer. The arrangement of the rectifiers within the two lower bridges and the connection of the bridges to each other and to the AC network are already known. The invention refers solely to the two upper converter bridges and the characteristic features are clear from the claims.

The two upper converter bridges III and IV are connected to the transformers T over an intermediate circuit comprising insulating transformers IT. These are located in a position where they are insulated from earth, and their feeding winding 4 is connected to the tank 5 which is in turn connected to the center of the direct voltage chain 6, which in this case has the potential 375 kv. In this way the continuous internal direct voltage stress in the transformers is reduced. This arrangement requires that the insulating transformers must be located in a position where they are insulated from earth on platforms having a direct voltage potential of 375 kv. The insulating transformers are connected to the AC network over conventional transformers, preferably similar to those used for the two lowest bridges.

FIG. 1 shows that it is possible to use three one-phase three-winding transformers to feed the insulating transformers for the two converter bridges located at the same level. The difference between the equipment for the two lower and the two upper bridges is that the latter have an insulating transformer between the secondary windings of the transformers T and the converter bridges. In the example shown the insulating transformers associated with the two uppermost bridges IV are also connected to the center points 6 of the chains A and B, respectively. Of course the tank and feeding winding of each insulating transformer feeding chain A are connected to the center point of this chain, as is also the case for chain B. This is necessary in case such a fault occurs on a chain that it must be taken out of operation and disconnected. The rest of the converter equipment must then be able to operate undisturbed.

FIG. 2 shows an alternative in which the upper half of both the chains is fed from three one-phase three-winding transformers 10, 11, 12, each having two secondary windings 13 and 14. The insulating transformers are also made as three-winding transformers 15 having secondary windings 16, 17, one for each of the chains A and B. As can be seen from FIG. 2, the secondary windings 13 feed the lower bridge III and the secondary windings 14 the upper bridge IV. In the insulating transformers the secondary winding 16 is connected to chain B and the secondary winding 17 to chain A. This is also true for the secondary windings 14. Since the insulating transformers are connected to both the chains, the connection of feeding windings and tanks to the DC chain must be carried out so that the connection may be made with free choice. The conductor 18 connected to the tanks 5 is joined to the chain A by a conductor 19 and to the chain B by a conductor 20. The conductors 19 and 20 suitably contain breakers 21 and 22, respectively.

One advantage with the alternative according to FIG. 2 is that the transformer units 10, 11 and 12 become twice as large as the six transformers T which, according to FIG. 1, feed the upper bridges. Bigger units produce improved efficiency.

Figure 3:
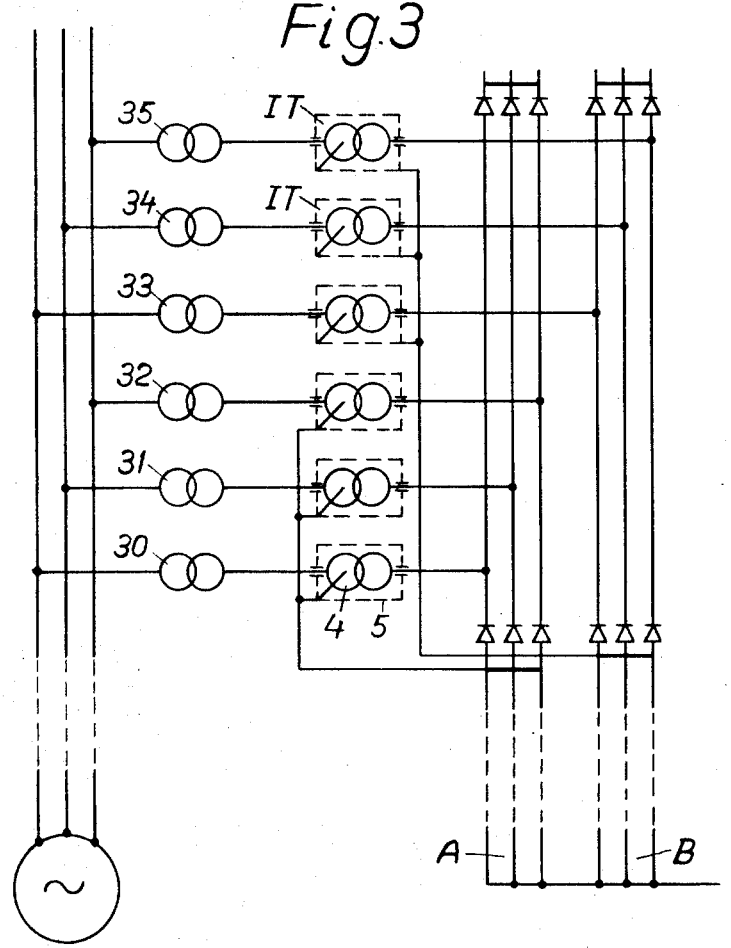
FIG. 3 shows a connection diagram for a converter bridge including transformers according to a third alternative.

According to a third alternative which is shown in FIG. 3 two-winding transformers are used throughout. The figure shows one of the two upper steps in the converter equipment, for example the third. The six transformers 30, 31, 32, 33, 34 and 35 which are connected to the AC network are quite conventional two-winding transformers and the insulating transformers are the same as in the alternative shown in FIG. 1. The three lower transformers feed chain A and for this reason the casing of the corresponding insulating transformers is connected to this chain. The same is true for the transformers connected to chain B. This alternative requires more transformers but in return offers simpler connection within the station and better clarity.

Each converter chain A or B is connected to the line L over a smoothing reactor 23 or 24. The reactors are enclosed in casings 25, 26, respectively, which is put in position already insulated and connected by conductors 27, 38 to the closest lower direct voltage potential, which in the shown case are 562.5 kv. The voltage drop between winding and casing will thus be only 187.5 kv.

Figure 4:
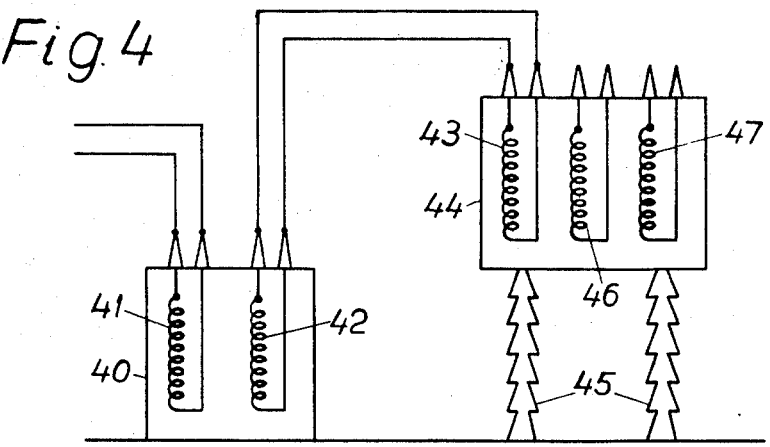
FIG. 4 shows schematically how the winding are connected together in two cascade connected transformers and output terminals for auxiliary power.

The invention can also be used for the equipment for transferring auxiliary power to the converter bridges at high potential. This is shown schematically in FIG. 4. The transformer 40 connected to the AC network has a network winding 41 and a cascade winding 42 which is connected to the cascade winding 43 in the insulating transformer 44. As mentioned previously, this is placed in position and insulated from earth, for example with the help of insulators 45. The rectifier winding connected to the converters is designated 46. The insulating transformer is also provided with an auxiliary winding 47 from which the auxiliary power is withdrawn which is required for the apparatus in the converter bridge. This winding may therefore also be made for considerably lower levels of insulation.

The reactances of the insulating transformers and the transformers connected to the AC network, the system transformers, are adapted so that together they acquire the desired values.

All insulating transformer units must be protected by suitable surge diverters between the tank and the winding which is connnected to the converters.

I claim:

1. A converter station for connecting a DC network for ultrahigh voltage to an AC network comprising at least one chain comprising a converter bridge means each including at least one converter bridge, all the converters of the chain being series-connected of the DC side, and electrical apparatus connected to said bridges and at least some of said apparatus being located at high potential, said apparatus including transformer means for connection to an AC network and connected to said converter bridges on the AC side, at least some of the apparatus located at high potential having tanks enclosing the apparatus and means connecting said tanks to the DC side of the chain at a point where the potential in relation to earth is at least half the voltage in the DC network.

2. A converter station as claimed in claim 1 having two chains connected in parallel between the DC line and earth.

3. A converter station as claimed in claim 1, having two chains connected in parallel between the DC line and earth, and in which said transformer means comprises transformers having three windings, one of said windings being connected to the AC network and the other two windings being connected one to converter bridge means at the same voltage level of each of the chains.

4. A converter station as claimed in claim 1, having two chains connected in parallel between the DC line and earth, each chain comprising four series-connected converter bridges, and in which said transformer means comprises transformers having three windings, one of said windings being connected to the AC network and the other two windings being connected one to the uppermost converter bridge and the other to the second uppermost converter bridge.

5. A converter station as claimed in claim 1 having smoothing reactors insulated from earth connected between the uppermost converter bridge means and the DC network and having tanks connected to points in the upper half of the chain.

6. A converter station as claimed in claim 1, said transformer means comprising double transformer means connected to the converter bridge means of the upper half of the converter chain, including first transformers directly connected to the AC network and insulating transformers connected between the first transformers and the converter bridge means of the upper half of the chain, said insulating transformers being insulated from earth, said apparatus having tanks including said insulating transformers, and means connecting the winding on the AC side of each of the insulating transformers to the DC side of the chain at a point where the potential in relation to earth is at least half the voltage in the DC network.

7. A converter station as claimed in claim 6, in which there is an insulating transformer for each phase of each converter of the upper half of the chain.

8. A converter station as claimed in claim 6, in which said first transformers have three windings, one of said windings being connected to the AC network and the other two windings being connected one to converter bridge means at the same voltage level of each of the chains.

9. A converter station as claimed in claim 1, having two chains connected in parallel between the DC line and earth, said transformer means comprising double transformer means connected to the converter bridge means of the upper half of the converter chain, including first transformers directly connected to the AC network and insulating transformers connected between the first transformers and the converter bridge means of the upper half of the chain, said insulating transformers being insulated from earth, said apparatus having tanks including said insulating transformers, and means connecting the winding on the AC side of each of the insulating transformers to the DC side of the chain at a point where the potential in relation to earth is at least half the voltage in the DC network.

10. A converter station as claimed in claim 9, in which each chain comprises four series-connected converter bridges, and in which said first transformers have three windings, one of said windings being connected to the AC network and the other two windings being connected one to the upper most converter bridge and the other to the second uppermost converter bridge.

* * * * *